Patented Aug. 20, 1929.

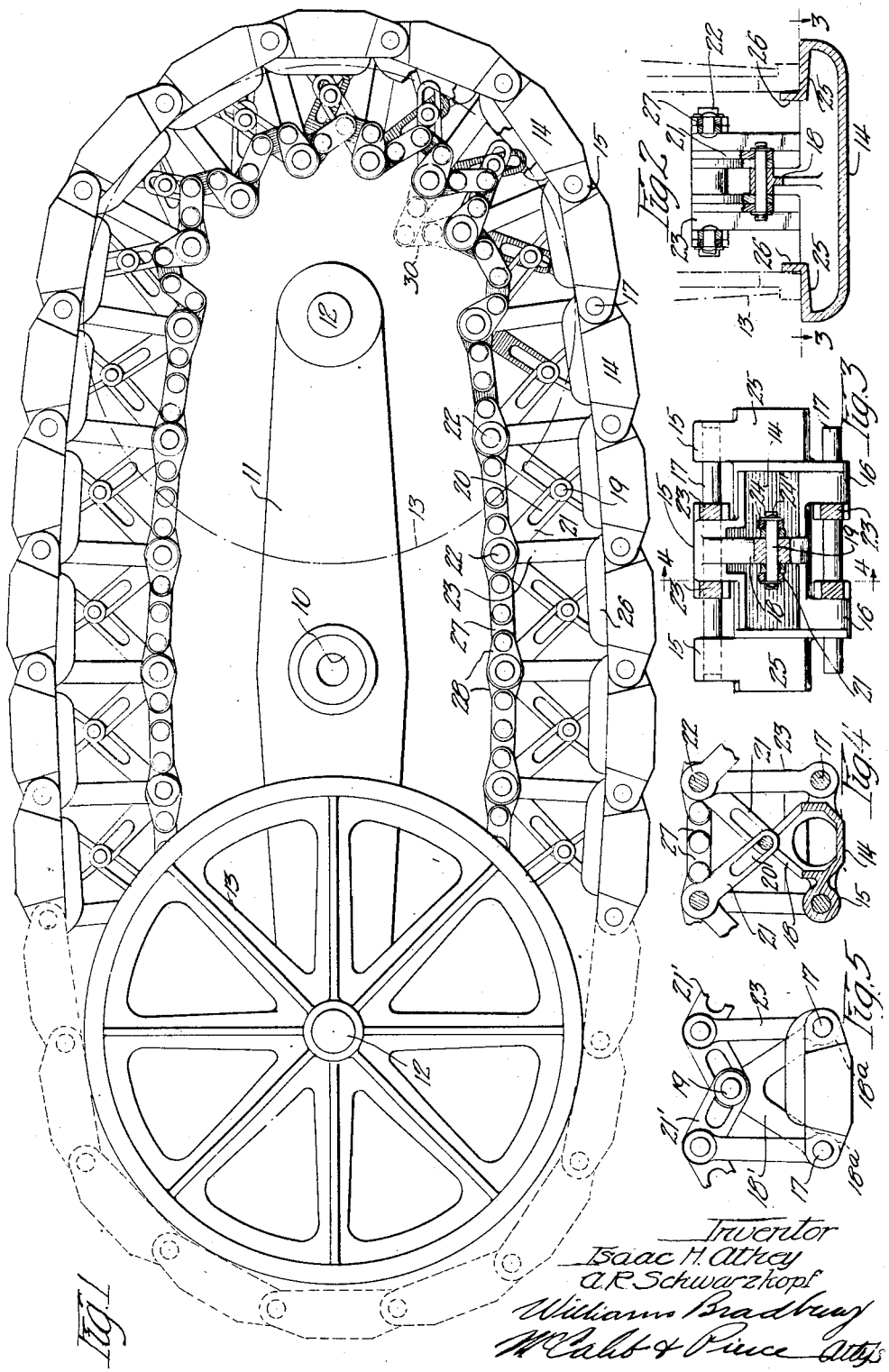

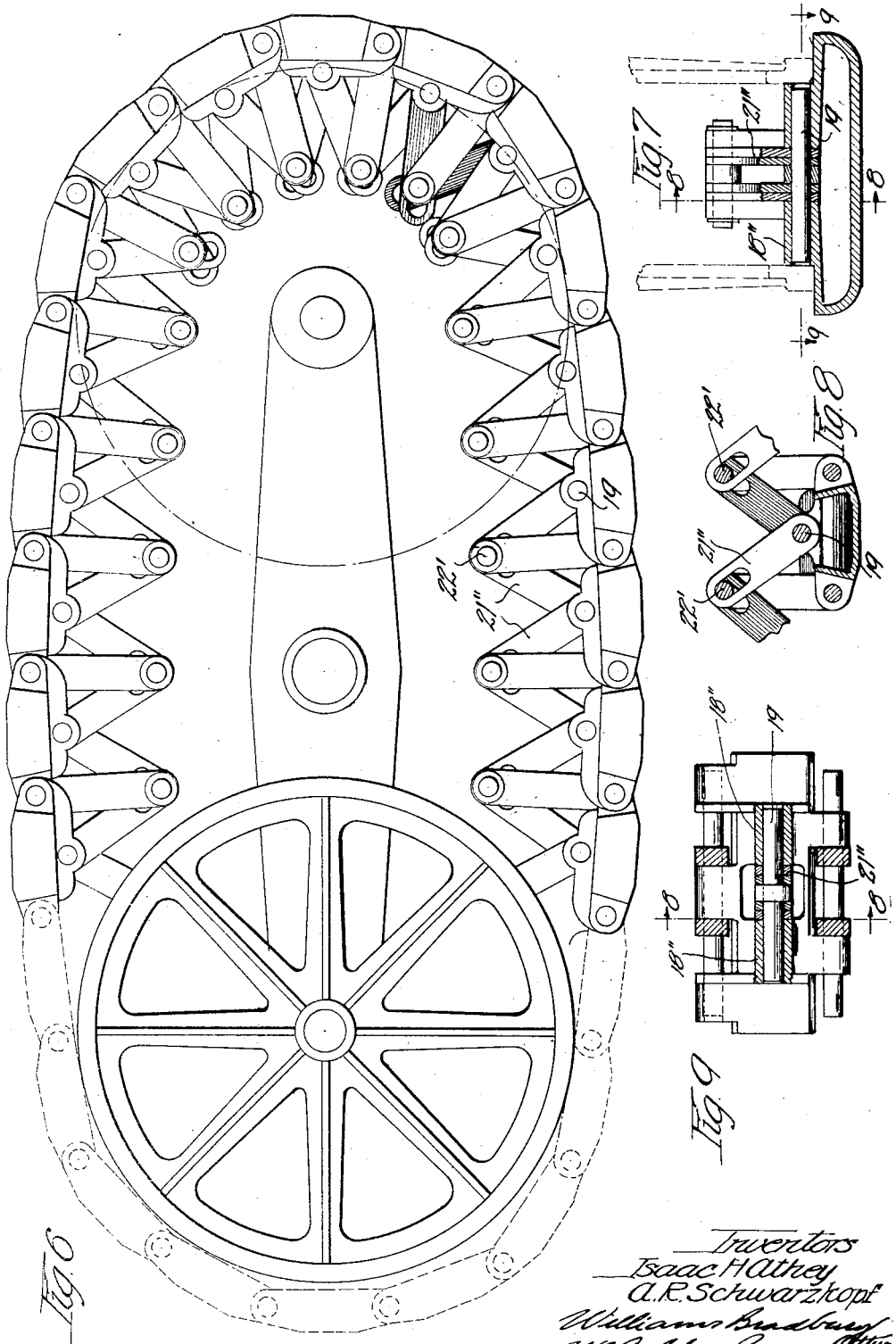

1,725,242

UNITED STATES PATENT OFFICE.

ISAAC H. ATHEY AND ARTHUR R. SCHWARZKOPF, OF CHICAGO, ILLINOIS, ASSIGNORS TO ATHEY TRUSS WHEEL CO., OF CHICAGO, ILLINOIS, A CORPORATION OF ILLINOIS.

VEHICLE.

Application filed February 1, 1923. Serial No. 616,394.

Our invention relates to improvements in vehicles, and is particularly concerned with improvements in vehicles of that type in which the load-supporting wheels roll on endless tracks or chains passing around the load-supporting wheels.

The objects of our invention are:

First: To provide a vehicle of the character described comprising a track or tread chain in which the various shoes forming the track chain are trussed so as to prevent the shoes, when in a load-supporting position, from flexing inwardly beyond a predetermined line;

Second: To provide a construction of the character described in which the tread portion of the shoes may be formed of cast metal and the elements for trussing the shoes may be cast, forged or stamped, as desired;

Third: To provide a shoe construction in which the stresses in the trussing elements are always in the same direction. In our construction compression stresses only are imposed upon certain elements and tension stresses only are imposed upon other elements. This is advantageous over those constructions in which the same elements are alternately subjected to compression and tension stresses, inasmuch as our construction delays or prevents the crystallization of the metal forming the trussing elements;

Fourth: To provide a construction in which the trussing elements can be easily and quickly assembled upon the tread member; and Fifth: To provide a construction of the character described which is simple in construction and economical to manufacture.

Other objects of our invention will appear as this description progresses, reference being had to the accompanying drawings, in which Figure 1 is a side elevation of a vehicle embodying our invention. In this figure one of the load-supporting wheels is shown in dotted outline;

Figure 2 is a transverse section through one of the shoes of the endless track;

Figure 3 is a horizontal section taken on the line 3—3 of Figure 2;

Figure 4 is a vertical section taken on line 4—4 of Figure 3;

Figure 5 is a side elevation of a shoe embodying a modified form of our invention;

Figure 6 is a view similar to Figure 1, but showing a still further modification of our invention;

Figure 7 is a vertical transverse section through one of the shoes forming the endless track of Figure 6;

Figure 8 is a vertical transverse section taken on line 8—8 of Figure 7; and

Figure 9 is a horizontal section taken on line 9—9 of Figure 7.

Throughout the several views, similar reference characters will be used for referring to similar parts.

In Figures 1 to 4 inclusive, we have illustrated our invention as being embodied in a vehicle comprising an axle 10 for carrying a load-supporting platform. A beam 11 is pivotally mounted on each end of the axle 10 and a shaft 12 is journaled in each end of the beam 11. The projecting ends of the shafts 12 each carry a load-supporting wheel 13, so that there is a pair of wheels 13 on each end of each beam 11, the respective wheels of each pair lying upon opposite sides of the beam 11.

The flexible chain upon which the load-supporting wheels 13 roll is formed of a plurality of shoes comprising the channel-shaped tread members 14, from one side of which project the three hinge lugs 15, the two outer ones of which are mounted in spaced relation to the intermediate one for receiving the two hinge lugs 16 projecting from the adjacent side of an adjacent shoe. Pintles 17 pivotally connect the hinge lugs of one shoe with the hinge lugs of adjacent shoes so as to form a flexible track or chain which can pass freely around the load-supporting wheels. A lug 18, formed integrally with each shoe, extends transversely thereof at a point intermediate the two ends of the shoe and extends inwardly therefrom. Each lug 18 carries a pivot pin 19, the ends of which project beyond the sides of the lug 18 to be received by the slots 20 in the outer ends of the truss links 21. The inner ends of the truss links 21 are pivotally mounted upon the pivot pins 22 which are carried by the inner ends of each pair of aligned compression links 23. The outer ends of these compression links are pivotally mounted upon the pintle 17 between the central hinge lug 15 and the hinge lugs 16, as clearly shown in Figure 3. The washers 24 and pins 24', or any other suitable means, may be used for retaining the slotted ends of the truss links 21 on the ends of the pivot pins 19.

The inner sides of the ends of the channel-shaped members 14 are bridged by integrally formed portions 25 (see Figures 2 and 3) to form supporting or tread surfaces for the load-carrying wheels 13. Transversely extending flanges 26, extending inwardly at the inner ends of the portions 25, provide means for aligning the shoes with the load-supporting wheels.

The construction thus far described forms a completely operative vehicle in which the truss links 21 hold the compression links 23 of the load-supporting shoes in the proper position to bear the stresses which they are designed to bear. However, on account of the direction of the tensions imposed upon the truss links 21, these members would have to be made unduly large where the vehicle is designed for carrying exceedingly heavy loads. To overcome this objection, we prefer to transfer a part of the stresses from the truss links 21 to the truss chain comprising the links 27, which are pivotally connected to each other and to other links 28 which are pivotally mounted upon the projecting ends of the pivot pins 22. In this manner the links 27 and 28 form a continuous chain, which assists the truss arms 21 in holding the compression links 23 in their proper positions on the shoes which are occupying the load-supporting positions. At the points where the shoes pass around the load-supporting wheels the links forming the truss chain may fold either outwardly as shown in full lines at the right-hand end of Figure 1, or, if the circumstances under which they operate compel them to, they may fold inwardly, as shown in dotted outline at 30 in Figure 1. The approach of the inner ends of the compression links toward each other, as the shoes pass around the wheel, causes the slotted ends of the truss links to slide outwardly past the ends of the pivot pins 19.

From the above description, it will be seen that substantially the only stresses imposed upon the links 23 are compression stresses and that tension stresses only are imposed upon the links 21. This is an advantage over certain prior constructions in which the truss arms of the shoes forming the track chain are alternately subjected to compression and tension, which hasten the crystallization of the metal of the truss arms.

In that form of our invention shown in Figure 5, the member 18′, which carries the pivot pin 19, is not formed integrally with the tread member, but is formed separately therefrom and has eyes 18ª at the opposite ends thereof for receiving the pintle pins 17. This construction makes the tread member easier to cast, and makes possible the use of stronger material in the member 18′. We have so constructed this form that the pivot pin 19 is raised higher in the tread member than in the construction shown in Figures 1 to 4 inclusive, thereby relieving to a certain extent the strain upon the truss links 21′ and thus making the truss chain construction of the preceding figures unnecessary.

In the embodiment of our invention illustrated in Figures 6 to 9 inclusive, we have shown a modified construction in which the truss links 21″ are pivotally mounted upon the pivot pins 19 and the inner ends of the truss links 21″ are slotted for receiving and sliding upon the pivot pins 22′. In this construction a greater strain is imposed upon the truss arms than in the construction shown in the preceding figures, and, consequently, a greater strain is imposed upon the pivot pins 19. For the purpose of securely anchoring these pins to the tread members and distributing the stresses imposed thereon, we elongate the member 18 of the preceding construction so that it forms in effect a plurality of aligned bearing blocks 18″ (see Figure 9). This construction collapses very compactly at the points where the track chain passes around the wheels, as is clearly shown in Figure 6.

While we have described the details of construction of the preferred embodiment of our invention, it is to be clearly understood that our invention is not limited to these details, but is capable of other adaptations and modifications within the scope of the appended claims.

Having thus described our invention, what we claim is:

1. A vehicle track chain formed of a plurality of shoes, each comprising a tread member having hinge lugs projecting from the opposite sides thereof, pintles for pivotally connecting the hinge lugs of adjacent shoes, a lug extending inwardly from each tread member, a pivot pin carried by each of said lugs, inwardly extending compression links pivotally mounted on said pintles, pivot pins carried by the inner ends of said compression links, truss links mounted on each of said last-named pivot pins and having slotted connections with the first-mentioned pivot pins of adjacent tread members, and a truss chain connecting each of the last named pivot pins with the corresponding adjacent pivot pins.

2. A vehicle track chain formed of a plurality of shoes, each comprising a tread member having hinge lugs projecting from the opposite sides thereof, pintles for pivotally connecting the hinge lugs of adjacent shoes, inwardly extending compression links pivotally mounted on said pintles, a pivot pin carried by the inner end of each compression link, collapsible means for connecting each pivot pin with the pivot pins on adjacent compression links, and means for maintaining a predetermined relation between the tread members and the compression links of the load-bearing shoes of said track.

3. A vehicle track chain formed of a plurality of shoes, each comprising a tread member having hinge lugs projecting from the opposite sides thereof, pintles for pivotally connecting the hinge lugs of adjacent shoes, inwardly extending compression links mounted at the sides of said tread members, a pivot pin carried by the inner end of each compression link, means for connecting each pivot pin with the pivot pins on adjacent compression links, and means for maintaining a predetermined relation between the tread members and the compression links of the load-bearing shoes of said track.

4. A vehicle track chain formed of a plurality of shoes, each comprising a tread member, said tread members being arranged side by side and pivotally connected, and collapsible means for trussing said tread members while they are sustaining a load comprising some members which are solely compresssion members and other members which are solely tension members.

5. A vehicle track chain formed of a plurality of shoes arranged side by side and pivotally connected, and means for trussing said shoes while they are occupying load-supporting positions, said means comprising tension truss links and compression members, said compression members extending inwardly from the pivotal connections between shoes and substantially at right angles thereto and said truss links extending between the compression members and the shoes.

6. A vehicle track chain formed of a plurality of shoes comprising tread members arranged side by side, pintles for pivotally connecting adjacent sides of said tread members, compression links supported by and extending inwardly from said pintles, and truss links pivotally mounted on the inner ends of said compression links and having a sliding connection with adjacent tread members.

7. A shoe for a vehicle track chain comprising a tread member, having hinge lugs projecting from the opposite sides thereof for the reception of pintles, an inwardly projecting compression member carried by each pintle, and a pair of rigid tension truss-links slidably interconnecting the inner ends of the compression members and the tread member.

8. An endless track for vehicles comprising a series of pivotally interconnected tread members, an inwardly projecting compression member carried by each pivot between the tread members, and rigid tension truss-links interconnecting each compression member with the two adjacent tread members and having slotted connections to permit the inner ends of adjacent compression members to approach each other.

9. An endless track for vehicles comprising a series of tread members pivotally joined together to form an endless chain, an inwardly projecting compression member pivotally carried by each joint between tread members, and a pair of rigid tension truss-links interconnecting each compression member and the adjacent tread members.

10. An endless track for vehicles comprising a series of pivotally interconnected tread members, pivotally interconnected trussing members for bracing the track, and a flexible chain interconnecting all of the trussing members.

11. An endless track for vehicles comprising a flexible chain, a series of pivotally interconnected tread members forming a flexible track outside of the chain, and a trussing structure including separate tension members and compression members interconnecting the chain and tread members.

12. An endless track for vehicles comprising a flexible tread composed of pivotally interconnected tread members, a flexible chain lying within the tread, and a collapsible trussing structure interconnecting each tread member and the chain.

13. A track for vehicles comprising an inner endless flexible chain, an outer endless flexible chain having tread surfaces, and a folding lattice-work like truss structure connecting each link of the outer chain with the inner chain.

In witness whereof, we hereunto subscribe our names this 10th day of January, 1923.

ISAAC H. ATHEY.
ARTHUR R. SCHWARZKOPF.